D. W. BOGER.
BAKING PAN.
APPLICATION FILED OCT. 27, 1913.

1,105,178.

Patented July 28, 1914.
2 SHEETS—SHEET 1.

WITNESSES:
Baylor Hull
May Montgomery

INVENTOR
Daniel W. Boger
BY
Hardway & Cathey
ATTORNEYS

D. W. BOGER.
BAKING PAN.
APPLICATION FILED OCT. 27, 1913.
1,105,178.
Patented July 28, 1914.
2 SHEETS—SHEET 2.
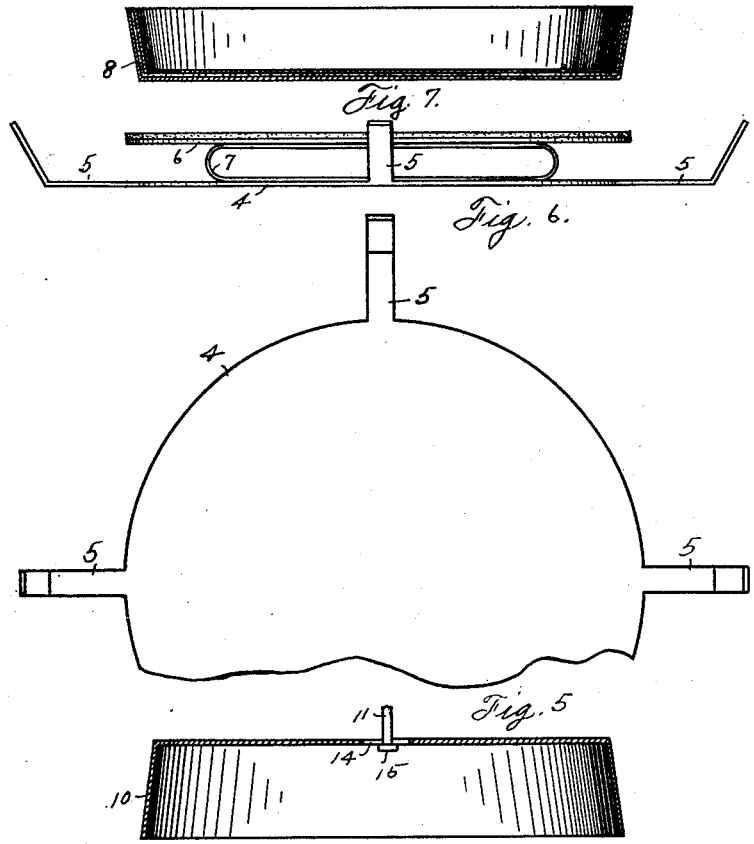
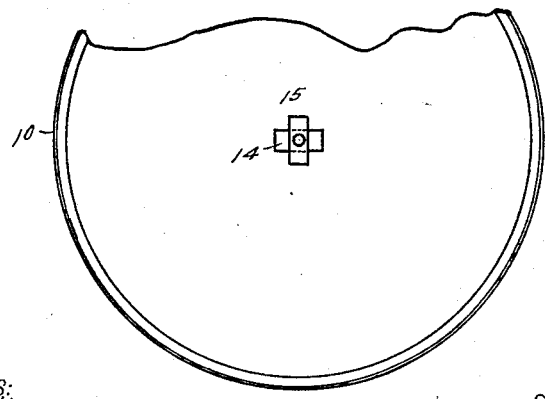

UNITED STATES PATENT OFFICE.

DANIEL W. BOGER, OF HOUSTON, TEXAS.

BAKING-PAN.

1,105,178.  Specification of Letters Patent.  Patented July 28, 1914.

Application filed October 27, 1913. Serial No. 797,464.

*To all whom it may concern:*

Be it known that I, DANIEL W. BOGER, a citizen of the United States, residing at Houston, in the county of Harris and State of Texas, have invented certain new and useful Improvements in Baking-Pans, of which the following is a specification.

This invention relates to new and useful improvements in baking pans.

The object of the invention is to provide a device of the character described for the purpose of baking bread and other like articles of food and is arranged so that the heat given off from the fuel burner will be confined so as to completely surround the pan, in which the articles to be cooked, are located.

A further feature of the invention resides in the provision of a baking pan formed in two parts, an upper and a lower, the upper of which forms a covering for the articles placed in the lower, and the invention also comprehends a surrounding heat retainer to which the upper of said parts is fixed, said retainer entirely surrounding the baking pan proper above and on all sides, and retaining the heat ascending therein, so that the same will surround the baking pan on all sides and the articles therein will bake uniformly, on all sides.

A further feature of the invention resides in the provision of a means for centering the heat retainer and the upper part of the baking pan carried thereby relative to the lower part of said pan.

With the above and other objects in view, the invention has particular relation to certain novel features of construction, operation and arrangement of parts, an example of which is given in this specification and illustrated in the accompanying drawings, wherein—

Figure 2:
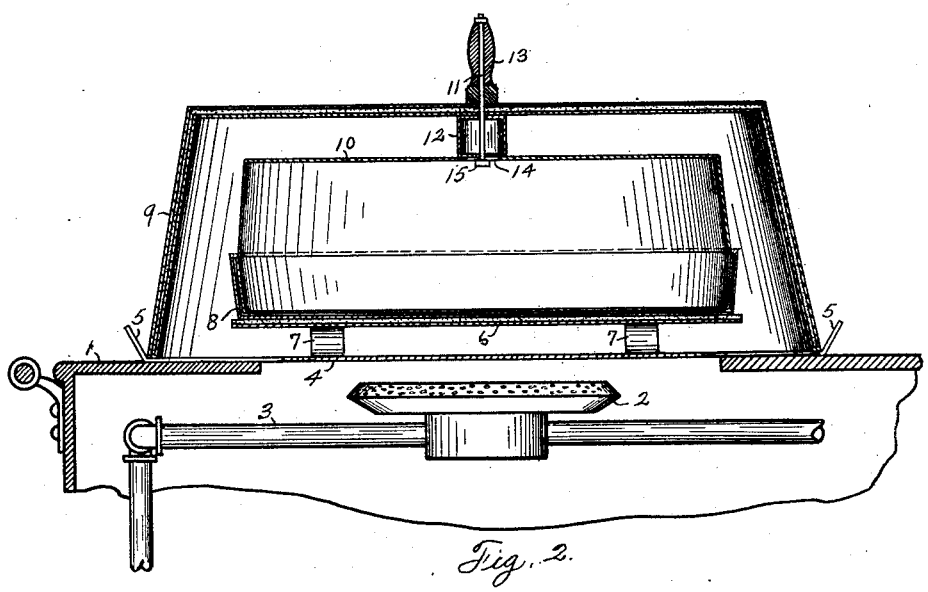
Figure 1:
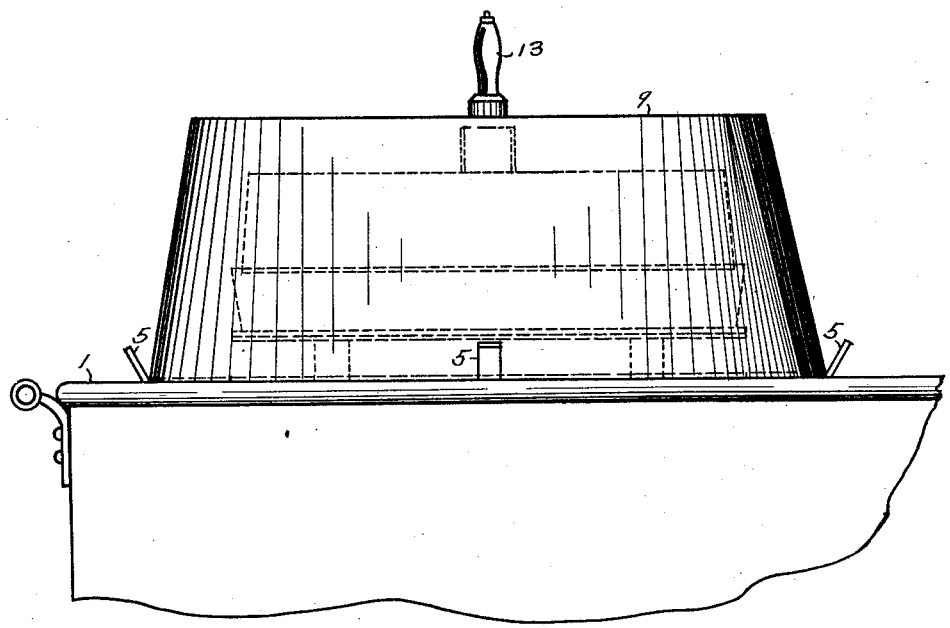

Figure 1 shows a side elevation of the complete device. Fig. 2 shows a sectional side view thereof. Fig. 3 shows a fragmentary plan view of the upper part of the baking pan proper. Fig. 4 shows a sectional side elevation thereof. Fig. 5 shows a fragmentary plan view of the device for centering the heat retainer. Fig. 6 shows an edge view thereof and also an edge view of the platform which supports the baking pan, and Fig. 7 shows a sectional side elevation of the lower part of the baking pan proper.

Referring now more particularly to the drawings wherein like numerals of reference designate similar parts in each of the figures, the numeral 1 refers to a stove of any suitable type, having the burner 2 supplied with fuel through the pipe 3. Said burner is alined underneath the burner opening in the top of the stove and resting upon said stove top over said opening is a thin circular metallic plate 4 smaller in diameter than the burner opening in the stove 1 so as to permit the flame from the burner to pass up through the opening and around said plate. Radiating from the plate 4, on opposite sides, are four fingers 5 which support said plate and have their free ends upwardly curved and provided for a purpose to be hereinafter described. Mounted upon the plate 4 is a removable platform 6, formed of two circular plates, the lower being of thin metal and the upper being a layer of asbestos. This platform is spaced from the metallic plate 5 by means of suitable supporting legs, 7.

The numeral 8 refers to the lower part of the baking pan proper. This part is a shallow pan having double walls and an intervening layer of asbestos and the platform 6 is slightly larger in diameter than the diameter of the pan so as to protect said pan from the direct currents of heat ascending from the burner 2.

The numeral 9 designates the heat retainer which is formed with double walls and an intervening layer of asbestos. This retainer is pan-shaped and in use is inverted, as shown in Figs. 1 and 2, so as to completely envelop the baking pan proper.

The upper part of the baking pan is designated by the numeral 10 which is formed of sheet metal and when in position forms with the lower part 8 a completely inclosed chamber. This upper part 10, in use, is fixed in position and held centered relative to the heat retainer 9 by means of the rod 11 and said part 10 is spaced from the top of the retainer 9 by means of a thimble 12, interposed therebetween and through which the rod 11 passes. This rod 11 passes also through the handle 13, which is provided for the purpose of removing and placing the heat retainer 9. The covering 10 has a centrally located oblong slot 14 and the lower end of the rod 11 carries an elongated head 15. When it is desired to remove the part 10, it may be turned until the slot 14 coincides with the head 15 and said part 10 may then be removed and in a similar manner when it is desired to replace said parts the slot 14 may be brought into coincidence with the head 15 and said head projected through said slot and the part 10 then turned until the slot extends at right angles to the head and when in this position the part 10 will be locked in position between the thimble 12 and the head 15.

The article to be baked is first placed in the lower part 8 of the baking pan and said part then placed upon the platform 6 which is alined above the burner. The heat retainer 9 is then placed in position, its lower rim being embraced by the upwardly curved ends of the fingers 5 and said fingers serving to center the heat retainer and to bring the upper part 10 of the baking pan immediately over the lower part 8 thereof.

It is obvious that the currents of heat ascending from the burner will be deflected by the platform 6 in all directions, but will be retained by the retainer 9 and the heat will completely surround and envelop the baking pan proper in which the articles to be cooked are located and said articles will be thoroughly and uniformly baked throughout.

It is apparent that this form of baking pan may be used in connection with any form of stove or fuel burner and will serve to utilize all of the heat passing therefrom, thus resulting in great economy of fuel, and it is also of light and simple construction so that it may be easily used and cleansed, thus forming a cheap and practical kitchen utensil.

While only one form of the device has been shown it is apparent that the mechanical features thereof may be modified to suit different requirements and I hereby reserve the right to make such mechanical changes thereof as will not depart from the scope of the appended claims.

What I claim is:—

1. A device of the character described including a supporting platform, a pan mounted thereon, a pan-shaped covering for the pan, said covering fitting closely on the pan and forming with said pan an inclosed chamber, a hood shaped heat retainer to which said covering is detachably secured and from which it is spaced on all sides, said retainer enveloping said pan and covering and means independent of said pan, pan covering and heat retainer for holding the retainer and covering centered relative to the pan.

2. A device of the character described, including a circular plate having radiating fingers, whose free ends are upwardly curved, extending therefrom, a supporting platform mounted on said plate and spaced therefrom, a pan mounted on said platform, a covering for the pan, said covering fitting closely on the pan and forming with said pan an inclosed chamber, a hood shaped heat retainer to which said covering is detachably secured, and from which it is spaced, said retainer enveloping said pan and covering and being held centered relative to the pan by means of said fingers.

3. A device of the character described, including a circular plate, smaller in diameter than the burner opening of the stove in connection with which said device is used, supporting fingers radiating from said plate and supporting the plate and having their free ends upwardly curved, a supporting platform mounted on said plate, a pan mounted on said platform, a covering for the pan, said covering forming with said pan, an inclosed chamber, a heat retainer to which said covering is detachably secured and from which it is spaced, said retainer enveloping said pan and covering and directing the flame from the stove burner on all sides of the pan and covering.

In testimony whereof I have signed my name to this specification in the presence of two subscribing witnesses.

DANIEL W. BOGER.

Witnesses:
  May Montgomery,
  Leo Carothers,